US011105607B2

(12) United States Patent
Weston et al.

(10) Patent No.: US 11,105,607 B2
(45) Date of Patent: Aug. 31, 2021

(54) NON-CONTACT PROBE AND METHOD OF OPERATION

(71) Applicant: RENISHAW PLC, Wotton-under-Edge (GB)

(72) Inventors: Nicholas John Weston, Peebles (GB); Yvonne Ruth Huddart, Dunbar (GB)

(73) Assignee: RENISHAW PLC, Wotton-under-Edge (GB)

( * ) Notice: Subject to any disclaimer, the term of this patent is extended or adjusted under 35 U.S.C. 154(b) by 146 days.

(21) Appl. No.: 16/316,995

(22) PCT Filed: Jul. 26, 2017

(86) PCT No.: PCT/GB2017/052182
§ 371 (c)(1),
(2) Date: Jan. 10, 2019

(87) PCT Pub. No.: WO2018/020244
PCT Pub. Date: Feb. 1, 2018

(65) Prior Publication Data
US 2019/0154430 A1    May 23, 2019

(30) Foreign Application Priority Data

Jul. 28, 2016  (EP) ...................... 16275107

(51) Int. Cl.
*G01B 11/02*   (2006.01)
*G01B 21/04*   (2006.01)
(Continued)

(52) U.S. Cl.
CPC .......... *G01B 11/026* (2013.01); *G01B 11/007* (2013.01); *G01B 11/25* (2013.01);
(Continued)

(58) Field of Classification Search
CPC ..... G01B 11/007; G01B 11/026; G01B 11/25; G01B 11/2527; G01B 11/24; G01B 11/08;
(Continued)

(56) References Cited

U.S. PATENT DOCUMENTS 4,847,687 A   7/1989 McDonnell et al.
5,025,665 A   6/1991 Keyes, IV et al.
(Continued)

FOREIGN PATENT DOCUMENTS

CN  101261118 A   9/2008
CN  101558283 A   10/2009
(Continued)

OTHER PUBLICATIONS

Nikon XC65Dx(-LS) Product Brochure, Digital Cross Scanners, Nikon Metrology.
(Continued)

*Primary Examiner* — Michael P Stafira
(74) *Attorney, Agent, or Firm* — Oliff PLC

(57) ABSTRACT

A method of putting a feature of interest on an object and an optical inspection system of a non-contact probe mounted on a positioning apparatus in a desired relationship. The method includes: a) identifying a target point of interest on the object to be inspected by arranging the non-contact probe and object at a first relative configuration at which a marker feature, projected by the non-contact probe along a projector axis that is not coaxial with the optical inspection system's optical axis, identifies the target point of interest; and b) subsequently moving the non-contact probe and/or object so as to put them at a second relative configuration at which the target point of interest and optical inspection system are at
(Continued)

Figure 1:
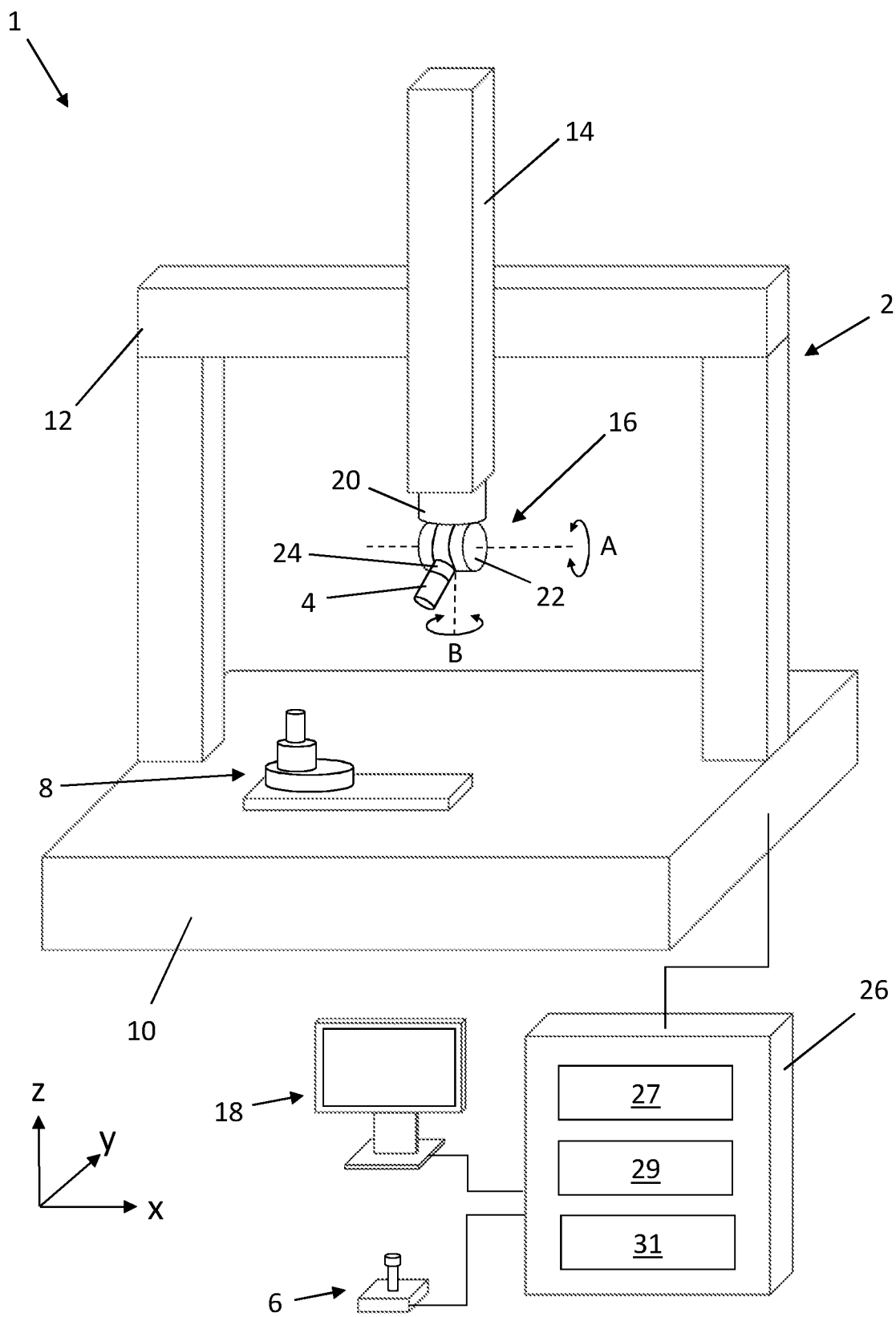

the desired relationship, in which the positioning apparatus is configured to guide such motion in accordance with the control path.

24 Claims, 6 Drawing Sheets

(51) Int. Cl.
| | | |
|---|---|---|
| *G01B 11/25* | (2006.01) | |
| *G01B 11/00* | (2006.01) | |
| *G01N 21/89* | (2006.01) | |
| *G01N 21/95* | (2006.01) | |
| *G06T 7/00* | (2017.01) | |

(52) U.S. Cl.
CPC ...... *G01B 11/2513* (2013.01); *G01B 11/2527* (2013.01); *G01B 21/042* (2013.01); *G01N 21/8901* (2013.01); *G01N 21/95* (2013.01); *G06T 7/0004* (2013.01)

(58) Field of Classification Search
CPC ..... G01B 11/02; G01B 11/002; G01B 11/028; G01B 11/2441; G01B 21/042; G01B 9/02038; G01B 9/02057; G01B 9/0209; G01B 11/005; G01B 11/2513; G01B 9/02003; G01B 9/02007; G01B 11/00; G01B 11/024; G01B 11/303; G01N 21/8901; G01N 21/95; G01N 21/3581; G01N 27/06; G01N 27/28; G01N 27/327; G02B 13/08
See application file for complete search history.

(56) References Cited

U.S. PATENT DOCUMENTS

| | | | |
|---|---|---|---|
| 6,628,322 B1* | 9/2003 | Cerruti | B25J 9/1697 348/135 |
| 8,601,701 B2 | 12/2013 | Wallace | |
| 8,792,707 B2 | 7/2014 | Weston et al. | |
| 2006/0202103 A1 | 9/2006 | Weiss | |
| 2007/0043526 A1* | 2/2007 | De Jonge | G01B 21/042 702/94 |
| 2008/0024793 A1* | 1/2008 | Gladnick | G01B 11/25 356/603 |
| 2010/0046005 A1 | 2/2010 | Kalkowski et al. | |
| 2010/0142798 A1* | 6/2010 | Weston | G06T 7/521 382/141 |
| 2012/0151988 A1* | 6/2012 | Weekers | G01B 3/30 73/1.79 |
| 2013/0090878 A1* | 4/2013 | Somerville | G06F 15/00 702/95 |
| 2013/0113919 A1 | 5/2013 | Qiao et al. | |
| 2014/0182150 A1* | 7/2014 | Nishikawa | G01B 5/20 33/503 |
| 2015/0377606 A1* | 12/2015 | Thielemans | H04N 9/3185 356/625 |
| 2018/0112971 A1* | 4/2018 | Jensen | G01B 11/005 |
| 2019/0025793 A1* | 1/2019 | Ould | B23Q 17/22 |

FOREIGN PATENT DOCUMENTS

| | | |
|---|---|---|
| CN | 101821578 A | 9/2010 |
| CN | 1024451183 B | 12/2013 |
| CN | 104165599 A | 11/2014 |
| EP | 0 402 440 B1 | 6/1995 |
| EP | 0877225 A2 | 11/1998 |
| EP | 1069440 B1 | 5/2002 |
| EP | 2538173 A1 | 12/2012 |
| JP | H03-162645 A | 7/1991 |
| JP | 2005-017336 A | 1/2005 |
| WO | 2009/024756 A1 | 2/2009 |
| WO | 2009/024757 A1 | 2/2009 |
| WO | 2009/024783 A1 | 2/2009 |
| WO | 2011/030090 A1 | 3/2011 |

OTHER PUBLICATIONS

"Laser Scanning—T-Scan / T-Track / T-Point". Zeiss, URL:<http://optotechnik.zeiss.com/en/products/3d-scanning/laser-scanning>.
"T-Scan Automated—Automated Laser Scanner". Zeiss, URL:<http://optotechnik.zeiss.com/en/products/3d-scanning/laserscanner-t-scan-automated>.
Feb. 16, 2017 Search Report issued in European Patent Application No. 16 27 5107.
Oct. 6, 2017 International Search Report issued in International Patent Application No. PCT/GB2017/052182.
Oct. 6, 2017 Written Opinion of the International Searching Authority issued in International Patent Application No. PCT/GB2017/052182.

* cited by examiner

NON-CONTACT PROBE AND METHOD OF OPERATION

This invention relates to a method for arranging a non-contact probe and object with respect to each other.

Non-contact probes are known for inspecting an object, e.g. for inspecting/measuring the surface of an object. For effective inspection it can be necessary to arrange the non-contact probe and object in a particular relationship. For example, a non-contact probe can comprise an optical inspection system, such as a camera, and it can be desirable to arrange the part of the object to be inspected so as to be located at a given height or within a given height range with respect to the optical inspection system (e.g. within a given depth of field, also called focus range or effective focus range, of the optical inspection system).

When setting up a non-contact probe it can be difficult for a user to ensure that the non-contact probe and the part of the object to be inspected are in the desired relationship. For example, even if the user is presented with a display showing an image captured by the optical inspection system it can be difficult for the user to know when the object is within the optical inspection system's depth of field (e.g. calibrated depth of field).

It is known to project an optical marker onto the object and when the user puts the marker in a particular place with respect to another optical feature such as a line-stripe projected onto the object then the user knows that the probe is properly arranged. However, especially when the non-contact probe is mounted on a positioning apparatus (e.g. as opposed to being hand-held) it can be awkward and time-consuming for the user to use the range finder to put the non-contact probe and object in the desired relationship.

The present invention provides an improved method and apparatus for arranging a non-contact probe and object with respect to each other. According to the invention, once the user has identified a point of interest on the surface of the object (e.g. by locating a projected marker feature on the point of interest), subsequent relative motion of the non-contact probe and object is guided by the positioning apparatus so as to aid putting the point of interest and non-contact probe at a desired relationship.

Accordingly, there is provided a method of putting a feature/point of interest on an object and an optical inspection system of a non-contact probe mounted on a positioning apparatus in a (predefined) desired relationship. The method can comprise identifying a target point of interest on the object to be inspected by arranging the non-contact probe and object at a first relative configuration at which a marker feature, projected by the non-contact probe (e.g. along a projector axis that is not coaxial with the optical inspection system's optical axis), identifies the target point of interest. The method can comprise subsequently moving the non-contact probe and/or object so as to put them at a second relative configuration at which the target point of interest and optical inspection system are at the (predefined) desired relationship. The positioning apparatus can be configured to guide such motion, e.g. in accordance with a predetermined/control path. Accordingly, such motion can be effected by moving one or more relatively moveable parts of the positioning apparatus on which the non-contact probe is mounted.

According to a first aspect of the invention there is provided a method of putting a feature/point of interest on an object and an optical inspection system of a non-contact probe mounted on a positioning apparatus in a (e.g. predefined) desired relationship, the method comprising: a) identifying (e.g. specifying, registering or selecting) a (target) point of interest on the object to be inspected by arranging the non-contact probe and object at a first relative configuration at which a marker feature, projected by the non-contact probe along a projector axis that is not coaxial with the optical inspection system's optical axis, identifies the (target) point of interest; and b) subsequently moving the non-contact probe and/or object so as to put them at a second relative configuration at which the target point of interest and optical inspection system are at the (predefined) desired relationship, in which the positioning apparatus is configured to guide such motion (e.g. in accordance with a control path).

Using the method of the present invention, the user can simply register/identify/specify/select a (target) point of interest by arranging the projected marker feature so that it falls on the (target) point of interest on the object without having to be concerned about whether the non-contact probe and object are at the (predefined) desired relationship. Accordingly, the (target) point of interest can be any point on the object (e.g. which lies on a surface that the user is interested in inspecting/measuring). Optionally, the method comprises receiving an indication (e.g. an input from the user) that the marker feature identifies the point of interest. Accordingly, the method can comprise receiving a signal (e.g. from the user) indicating that in the current/first relative configuration of the object and non-contact probe, the projector marker feature identifies the point of interest. Accordingly, the method can comprise receiving a signal (e.g. from the user) indicating that in the current/first relative configuration of the object and non-contact probe, the projector axis intersects the point of interest on the surface of the object to be inspected. Subsequent motion so as to put the point of interest registered by the user at a (predefined) desired relationship with respect to the optical inspection system is guided by the positioning apparatus (e.g. in accordance with a control path), thereby aiding this process. In other words, the coordinate positioning apparatus can be configured to guide the non-contact probe and/or object toward the second relative configuration. Such guidance could take place by restricting/limiting the relative motion of the non-contact probe and object. For example, subsequent relative motion could be restricted to directions and/or orientations which advance the non-contact probe and/or object toward the second relative configuration/desired relationship. Optionally, relative motion which comprises reversing the non-contact probe and/or object back toward the first relative configuration could be allowed.

The method can comprise determining a control path for guiding (subsequent) relative movement of the non-contact probe and the object/point of interest (e.g. from their relative position at step a) toward the desired relationship). Accordingly, in step b) the positioning apparatus can be configured to guide such motion in accordance with the control path. As will be understood, determining a control path for guiding (subsequent) relative movement of the non-contact probe and the object/point of interest could form at least part of a step of the method between a) and b). Accordingly, step b) could become step c), and step b) could comprise determining a control path for guiding (subsequent) relative movement of the non-contact probe and the object/point of interest.

A control path could determine/specify the direction of subsequent motion. Once the target point of interest on the object to be inspected has been identified, the method can comprise determining how to control the positioning apparatus so as to control the direction of subsequent motion (e.g.

in step b)). Accordingly, determining a control path could comprise determining how to control the positioning apparatus so as to control the direction of subsequent motion (e.g. in step b)). This could comprise determining how to control the moveable axes of the positioning apparatus so as to control the direction of subsequent motion (e.g. in step b)). The positioning apparatus could determine the control path/determine how to control (e.g. the moveable axes of) the positioning apparatus. For example, the positioning apparatus could comprise a controller device, e.g. configured to determine the control path/determine how to control (e.g. the moveable axes of) the positioning apparatus. A processor device could determine the control path/determine how to control (e.g. the moveable axes of) the positioning apparatus. The positioning apparatus could comprise the processor device. The processor device could be generic or bespoke. In other words, at least part of the method, e.g. at least the determining of the control path and/or step b) is/are computer implemented. As will be understood, a controller/processor device could guide/restrict the motion.

Optionally, the subsequent motion comprises translational motion, e.g. lateral and/or vertical relative motion of the non-contact probe and object, for instance, with respect to the object. In other words, the subsequent motion can comprise adjusting the lateral position and/or height of the non-contact probe with respect to the object.

The positioning apparatus could be configured to facilitate relative movement of the non-contact probe and object in at least one linear degree of freedom, optionally in at least two linear degrees of freedom, for example in at least three linear/translational degrees of freedom. The linear/translational degrees of freedom could be perpendicular to each other.

The positioning apparatus could be configured to facilitate relative movement of the non-contact probe and object in at least one rotational degree of freedom, optionally in at least two rotary degrees of freedom, for example in at least three rotational degrees of freedom. For example, the non-contact probe could be mounted on an articulated head which facilities relative reorientation about at least one axis, for instance about at least two (optionally orthogonal) axes. The articulated head could be mounted on a movement structure. The movement structure could be configured with one or more linear guideways which permit/facilitate linear translation of the articulated head (and hence linear translation of the non-contact probe mounted on the articulated head), e.g. in at least one linear dimension, optionally at least two orthogonal linear dimensions, for instance at least three orthogonal linear dimensions (e.g. X, Y, Z).

Positioning apparatus that facilitate movement in three linear degrees of freedom and two rotational degrees of freedom are commonly referred to in the metrological industry as "five-axis" measurement devices. Such "five axis" systems are different to other types of positioning apparatus such as robot arms. However, as will be understood, the invention is not limited to such five-axis systems and can be used with systems that facilitate movement through fewer or more degrees of freedom, for instance through three, four or more rotational degrees of freedom.

Determining a control path can comprise determining a translational path along which the object and/or non-contact probe are to be moved. Accordingly, the predetermined/control path can comprise a translational path along which the object and/or non-contact probe are to be translated.

Optionally, the positioning apparatus is configured to guide such subsequent motion (e.g. in step b) in accordance with predetermined relative orientation information. Accordingly, optionally the method comprises moving the non-contact probe and/or object so as to put them at a second relative configuration at which the target point of interest and optical inspection system are at the (predefined) desired relationship, in which the positioning apparatus is configured to guide such motion (e.g. in step b) in accordance with a predetermined/control course of motion comprising/describing the relative translational path of the non-contact probe and object and their relative orientation along the translational path. Accordingly, determining the control path can comprise determining how to control the relative orientation of the object and/or non-contact probe along the translational path.

The positioning apparatus could comprise a coordinate positioning apparatus. The positioning apparatus could comprise a computer controlled positioning apparatus, for example a computer numerically controlled (CNC) positioning apparatus. Suitable positioning apparatus include coordinate measuring machines (CMM) and machine tools. The positioning apparatus could comprise a Cartesian or non-Cartesian positioning apparatus. As will be understood, the positioning apparatus can comprise devices/parts other than the (e.g. movement) structure on which the non-contact probe and/or object are mounted. For example, the positioning apparatus can comprise one or more processor devices, for example controllers and/or computers, which are in communication with the structure on which the non-contact probe and/or object are mounted. Such devices could be physically separate to the structure on which the non-contact probe and/or object are mounted. Such devices could comprise one or more input and/or output devices, e.g. a human-computer interface.

Optionally, the non-contact probe is moved during the subsequent motion (e.g. in step b)). Optionally, the object is kept stationary during the subsequent motion (e.g. in step b)). Accordingly, the subsequent motion (e.g. in step b)) could comprise lateral and/or vertical motion of the non-contact probe, and optionally rotational motion of the non-contact probe. Accordingly, the non-contact probe could be mounted on a moveable part of the positioning apparatus. In the field of metrology, in particular CMMs, this is often called the head, or quill of the positioning apparatus.

Optionally, the control path is configured) such that at the second relative configuration the projector axis intersects the surface of the object at the same position at which it intersected the surface of the object at the first relative configuration. Optionally, the positioning apparatus is configured to guide the subsequent motion (e.g. in step b)) such that at the second relative configuration the projector axis intersects the surface of the object at the same position at which it intersected the surface of the object at the first relative configuration.

Optionally, the control path is configured such that during the motion between the first and second configurations, the projector axis intersects the surface of the object at the same point at which it intersected the surface of the object at step a). Optionally, the positioning apparatus is configured such that during the subsequent motion between the first and second configurations, the projector axis intersects the surface of the object at the same point at which it intersected the surface of the object at step a). Optionally, the control path is configured such that during the motion between the first and second configurations the projector axis always intersects the same point at which it intersected the surface of the object at step a). Optionally, the positioning apparatus is configured to guide the motion such that during the motion between the first and second configurations the projector axis always intersects the same point at which it intersected the surface of the object at step a).

Optionally, (e.g. the control path is configured such that) the change in position between the first and second configurations is along an axis parallel to the projector's projector axis at the first relative configuration. Optionally, (e.g. the control path is configured such that) the motion between the first and second configurations is along an axis parallel to the projector's projector axis at the first relative configuration. Optionally (e.g. the control path is configured such that) the non-contact probe and object move relative to each other between the first and second configurations along a line parallel with the projector's projector axis at the first relative configuration.

Accordingly, the predetermined/control path can be parallel to (e.g. is coincident with) the projector's projector axis at the first relative configuration. Optionally, (e.g. the control path is configured such that) the non-contact probe and object could move relative to each other between the first and second configurations along the projector axis as it (the projector axis) was at the first relative configuration. Optionally, (e.g. the control path is configured such that) the relative orientation of the non-contact probe and object is the same at the first and second relative configurations. Accordingly, in this case, the location/orientation of the projector axis remains unchanged between the first and second relative configurations, and optionally does not move during the motion between the first and second relative configurations.

The relative configuration of the non-contact probe and object can comprise the relative position of the non-contact probe and object (in other words, the relative translational position of the non-contact probe and object). Optionally, the relative configuration of the non-contact probe and object comprises the relative orientation of the non-contact probe and object. For example, the relative configuration of the non-contact probe and object can comprise the rotational orientation of the non-contact probe and/or object about at least one rotational axis, e.g. at least two rotational axes.

Step a) can comprise a person (e.g. a user/operator) manually manipulating the relative configuration of the object and/or non-contact probe. The person could do so via an input device, such as a joystick. Other suitable input devices include a mouse, trackball, or a keyboard. Step a) can comprise (manually) manipulating the relative position and/or relative orientation of the non-contact probe and object so as to arrange them at the first relative configuration.

Optionally, the marker feature on the object is visible to a person (e.g. an operator/user). That is, optionally the marker feature comprises light in the visible spectrum. This is, for example, in contrast to the marker feature only being visible via a detector and display device.

Optionally, the intersection of the projector axis with the object is positively identified, e.g. is positively visually identified. Accordingly, the marker feature can be located on the projector axis. Optionally, the marker feature comprises a spot which is on the projector axis (e.g. a spot, such as a solid spot which is centred on the projector axis). This could be in contrast, for example, to a ring which circles around the projector axis (and so which although identifies a target point of interest, is not actually on the projector axis).

Optionally, the non-contact probe comprises at least one marker feature projector. The marker feature projector could comprise a light source, such as a light emitting diode (LED) or a laser-diode for example. The marker feature projector could comprise one or more optical elements, e.g. lens, Fresnel-Zone Plate, beam splitter, beam-steerer, mirror, or the like.

The subsequent movement (e.g. step b)) can comprise the positioning apparatus automatically controlling motion of the non-contact probe and/or object so as to put the optical inspection system and at the target point of interest at the second relative configuration. In other words, the positioning apparatus can automatically control motion along a predetermined/control path. Accordingly, as well as guiding the relative motion in accordance with a predetermined/control path (e.g. by restricting/constraining the translational relative positioning of the non-contact probe and object to a predetermined path), the positioning apparatus can also automatically move the non-contact probe and/or object along the predetermined/control path. Such an embodiment is explained in more detail below in connection with FIG. 3. This is in contrast, for example, to a person manually moving the non-contact probe and/or object along the path, whilst the coordinate positioning apparatus constrains/restricts motion so as to guide the non-contact probe and the point of interest on the object toward the desired relationship (e.g. in accordance with a predetermined/control path) (e.g. as explained below in connection with FIG. 8).

The method can comprise (e.g. determining a control path can comprise) determining the extent of motion (e.g. along the predetermined/control path) required so as to put the optical inspection system and the target point of interest at the second relative configuration (e.g. from the first relative configuration). As will be understood, this can be determined automatically, e.g. by the positioning apparatus, for example by a controller/processor device. As will be understood, determining the extent of motion, could comprise determining the second relative configuration.

At least one sensor configured to detect the marker feature can be provided. The sensor could comprise at least one position sensitive detector. The sensor could comprise a two-dimensional array of individual sensing elements, from which the position of the marker feature on the sensor can be determined. Suitable sensors include Charge-Coupled Device ("CCD") and Complementary Metal-Oxide Semiconductor ("CMOS") sensors. One or more optical elements, e.g. at least one lens, Fresnel-Zone Plate, beam-steerer, mirror or the like can be provided to facilitate detection of the marker feature by the sensor. Optionally, an image of the surface of the object is provided on the at least one sensor. Optionally, the sensor captures the image. Determining the extent of motion and/or the second relative configuration can comprise determining where the marker feature is on a sensor at the first relative configuration. Optionally, the non-contact probe comprises the at least one sensor, and optionally the one or more optical elements.

Accordingly, the non-contact probe could be configured to form (and optionally capture) on a sensor an image of the marker feature on the surface of the object. Determining the extent of motion and/or the second relative configuration can comprise determining the extent of motion required such that at the second relative configuration the marker feature is on a predetermined place on a sensor of the non-contact probe (e.g. within a predetermined region or point on the sensor). Determining the extent of motion and/or the second relative configuration can comprise determining the extent of motion required such that at the second relative configuration target point of interest on the object identified by the marker feature at the first relative configuration is on a predetermined place on a sensor of the non-contact probe (e.g. within a predetermined region or point on the sensor).

Determining the extent of motion and moving the non-contact probe and/or object along the predetermined/control path by the determined extent of motion can be, for example, in contrast to relatively moving the non-contact probe and/or object to the second relative configuration via a servo process or the like (e.g. via a process which continuously monitors one or more conditions, such as the position of the marker feature as it falls on a sensor of the non-contact probe, and adjusts the relative configuration of the non-contact probe and/or object until a precondition is met). Such a servo process could be performed manually or automatically.

The optical inspection system can be configured to form and optionally capture an image of the surface of the object on at least one sensor of the optical inspection system. Accordingly, the optical inspection system could comprise a camera. The optical inspection system could comprise one or more sensors. As above, suitable sensors comprise CCD or CMOS sensors. Optionally, the optical inspection system comprises one or more optical elements, e.g. one or more lenses, Fresnel-Zone Plate, mirror, beam-steerer or the like, for forming an image on the at least one sensor. The optical inspection system could have a depth of field (also called "focus range" or "effective focus range"). The depth of field could be a given/predefined or calibrated depth of field.

An optical pattern could be projected on the surface of the object, e.g. at least on the target point of interest and preferably on the surrounding area. Such an optical pattern could be used during (e.g. subsequent) inspection (e.g. measurement) of the surface of the object. Accordingly, the optical inspection system could be configured to detect the optical pattern projected onto the surface of the object.

The optical pattern could be projected over an area of the object. The pattern could extend over an area of the object so as to facilitate the measurement of a plurality of points of the object over the area imaged by the optical inspection system. Optionally, the pattern is a substantially repetitive pattern. The optical pattern could comprise a substantially periodic optical pattern. Optionally, the optical pattern is periodic in at least one dimension. Optionally, the optical pattern is periodic in at least two perpendicular dimensions.

Suitable optical patterns for use with the present invention include patterns of concentric circles, patterns of lines of varying colour, shades, and/or tones. Optionally, the optical pattern is a fringe pattern. For example, the optical pattern can be a set of sinusoidal fringes. As will be understood, an optical pattern for use in methods such as that of the present invention is also commonly referred to as a structured light pattern.

The optical pattern can be in the infrared to ultraviolet range. Optionally, the optical pattern is a visible optical pattern. Optionally, both the optical pattern and the marker feature are detectable by the optical inspection system. Optionally, the optical pattern and the marker feature comprise light comprising substantially the same wavelength. For example, optionally the optical pattern and the marker feature both fall within a band of wavelengths having a bandwidth/range of not more than 100 nm (nanometres), and for example not less than 20 nm, for instance at least 40 nm and not more than 60 nm, for example approximately 50 nm. Accordingly, optionally the optical inspection system is configured to detect the marker feature and the optical pattern. Optionally, the optical inspection system could be configured to detect light within a given wavelength band (e.g. via a filter). Optionally, the optical pattern and the marker feature both fall within the wavelength band. Again, such wavelength band could be not more than 100 nm (nanometres), and for example not less than 20 nm, for instance at least 40 nm and not more than 60 nm, for example approximately 50 nm.

The optical pattern could be projected onto the object via at least one optical pattern projector. Suitable projectors for the optical pattern include a digital light projector configured to project an image input from a processor device. The optical pattern could comprise at least one light source such as an LED or laser-diode for example. The optical pattern projector could comprise at least one light source and one or more diffraction gratings arranged to produce the optical pattern. Optionally the optical pattern projector could comprise at least one light source and at least one hologram. Further, the optical pattern projector could comprise at least one light source and at least one patterned slide. Optionally, the projector could comprise other optical elements such as a lens, mirror, beam steerer or the like.

The at least one optical pattern projector could be provided separately to the non-contact probe. Optionally, the non-contact probe comprises the at least one optical pattern projector. Accordingly, the optical inspection system and optical pattern projector could be fixed relative to each other. Optionally, the projected pattern and the projector axis overlap, at least at the (predefined) desired relationship.

The optical inspection system and marker feature projector can be fixed relative to each other. Accordingly, movement of the non-contact probe can cause the optical inspection system and the marker feature projector to move with each other. Optionally a housing comprises the optical inspection system and/or marker feature projector. In embodiments in which another projector is provided, e.g. an optical pattern projector, optionally the housing comprises that other projector too. The housing could comprise one or more mount features for mounting the housing to a positioning apparatus. Accordingly, the optical inspection system and marker feature projector (and optionally said other projector, e.g. an optical pattern projector) could be mounted to the positioning apparatus via a common mount. Such mount features could facilitate automatic loading/unloading of the non-contact probe on the positioning apparatus. Accordingly, the method could comprise automatically loading the non-contact probe onto the positioning apparatus, e.g. from a probe storage rack.

Optionally, the optical pattern and marker feature are distinct from each other such that they can be projected together (e.g. at the same time), or individually (e.g. at different times). For example, in embodiments in which the optical pattern and marker feature are both projected by the non-contact probe, the non-contact probe could be configured such that the optical pattern and marker feature are independently projectable, separate to from each other. This is contrast, for example, to embodiments in which the marker feature is integral to the optical pattern (e.g. a discontinuity such as a cross-hair being provided in the optical pattern). Optionally, the optical pattern projector and the marker feature projector are separate (i.e. not the same).

Optionally, the non-contact probe is configured such that the marker feature is detected by the optical inspection system, e.g. by the at least one sensor of the optical inspection system. Accordingly, optionally, the at least one sensor configured to detect the marker feature as described above, can be a sensor of the optical inspection system. Accordingly, in those embodiments where a projected optical pattern used for inspection, the same at least one sensor could be used to detect both the optical pattern as well as the marker feature.

The (predefined) desired relationship can comprise a (e.g. predefined) distance range between the optical inspection system and the target point of interest. In other words, the (predefined) desired relationship can comprise a (e.g. predefined) stand-off distance range between the optical inspection system and the target point of interest. Such a stand-off distance range could be referred to as a "height" range of the optical inspection system with respect to the target point of interest. The range could be so small so as to effectively define a single given distance or height. In embodiments in which the optical inspection system is an optical measurement system (as explained in more detail below), then the (predefined) desired relationship could be a (e.g. predefined) preferred/optimum measurement range of the optical measurement system. This could for example, be a calibrated measurement range of the optical measurement system.

In embodiments in which the optical inspection system comprises a given/(predefined) depth of field, the desired relationship can comprise one in which the target point of interest is within the depth of field. Accordingly, the second relative configuration could be one at which the target point of interest is within the optical inspection system's depth of field (e.g. calibrated depth of field).

As will be understood, the predefined desired relationship can be one in which the target point of interest is located within the field of view of the optical inspection system. Accordingly, the second relative configuration could be one at which the target point of interest is within the optical inspection system's field of view.

The desired relationship can comprise a predefined location of the (target) point of interest on a sensor of the optical inspection system (e.g. such that the point of interest is located/positioned within a predefined region on the sensor). In other words, the desired relationship can comprise a predefined location of the target point of interest within the optical inspection system's field of view.

The method could comprise obtaining one or more measurements about the surface of the object. The measurement(s) could comprise surface position and/or dimensional measurement information. Accordingly, the optical inspection system could be referred to as an optical measurement system. Optionally, the method can comprise analysing the optical pattern as detected by the optical inspection/measurement system in order to obtain one or more measurements about the surface of the object.

The method could comprise obtaining one or more images of the surface of the object, e.g. when the target point of interest and optical inspection system are at the desired relationship. This could be with the non-contact probe and/or object at the second relative configuration, or another, e.g. third relative configuration (explained below) at which the target point of interest and optical inspection system are at the desired relationship. Such images could be processed to determine measurement information about the surface of the object.

The method can comprise subsequently moving the non-contact probe and/or object to a third relative configuration. The third relative configuration could be a relative configuration at which the target point of interest and optical measurement system are still at the desired relationship (e.g. still within optical inspection system's measurement range/depth of field). Such movement could be performed automatically. For example, the positioning apparatus could be configured to hunt for a more optimum relative configuration. Optionally, such motion could be performed manually. For example, a person could use an input device to control such movement. Optionally, the positioning apparatus could be configured to restrict such manual motion such that it constrains the relative configuration of the non-contact probe and object such that they remain in the desired relationship. The method can comprise orbiting about the point of interest, e.g. to the third relative configuration.

Optionally, the marker feature positively/explicitly identifies the projector axis. For example, optionally the marker feature lies on the projector axis. This is, for example, in contrast to the marker feature surrounding the projector axis, e.g. such as the marker feature being a ring centred on the projector axis.

Optionally, the projector axis is not coaxial with the optical inspection system's optical axis. In other words, the projector axis is different to the optical inspection system's optical axis. Such an arrangement can help to simplify the optical arrangement of the non-contact probe, thereby reducing cost and/or weight (which can be important when the non-contact probe is to be mounted on a positioning apparatus, e.g. a CMM). Optionally, the projector axis is not parallel to optical inspection system's optical axis. Optionally, at least part of the projector axis falls within the optical inspection system's field of view. In other words, optionally the projector axis is at least partially contained within the optical inspection system's field of view. Optionally, the projector axis passes through the optical inspection system's measurement range and/or depth of field. As will be understood, the projector axis can be the axis along which the marker feature is projected from the non-contact probe (e.g. from the non-contact probe's housing), for example toward an object to be inspected.

Optionally, the method comprises calibrating the non-contact probe to determine the projector axis, e.g. relative to the optical axis. This could comprise taking one or more images of the projected marker feature on an (e.g. known) artefact, e.g. at each of a number of different known distances.

The point of interest can be on a non-planar and/or discontinuous face of the object. The point of interest can be on an unknown surface (e.g. a surface of unknown shape/form).

In accordance with the above, the positioning apparatus could operate in a first mode in which the relative motion of the non-contact probe and object are (relatively) unguided/unrestricted (e.g. during step a)), and in a second mode in which the relative motion of the non-contact probe and object are (relatively) guided/restricted (e.g. during step b)), e.g. in accordance with a predetermined/control path, for example so as to advance them toward the desired relationship. Optionally, a manual input device (e.g. a joystick) could be operated in a first mode in which manual control of the relative position of the object and non-contact probe is (relatively) unrestricted such that the user is free to select any relative position of the object and non-contact probe so as to identify the point of interest on the object, and a second mode in which manual control of the relative position of the object and non-contact probe is (relatively) restricted (i.e. compared to the first mode), e.g. such that the positioning apparatus guides the non-contact probe and the identified point of interest on the object toward the desired relationship. This could comprise restricting motion so as to ensure that the point at which the optical inspection system's optical axis intersects the surface of the object is maintained (e.g. at the position it was when a user indicated the marker feature identified the point of interest). This could comprise restricting relative motion to motion along the projector axis. As will be understood, the above described features of the first aspect of the invention can also be applicable to the below described other aspects of the invention, and vice versa.

According to second aspect of the invention there is provided a method of putting a feature of interest on an object and an optical inspection system of a non-contact probe mounted on a positioning apparatus in a desired relationship, the method comprising: identifying a target point of interest on the object to be inspected by arranging the non-contact probe and object at a first relative configuration at which a marker feature, projected by the non-contact probe along a projector axis that is not coaxial with the optical inspection system's optical axis, identifies the target point of interest; and subsequently the positioning apparatus automatically moving the non-contact probe and/or object so as to put them at a second relative configuration at which the target point of interest and optical inspection system are at the desired relationship.

According to another aspect of the invention there is provided a method of putting a feature of interest on an object and an optical inspection system of a non-contact probe mounted on a positioning apparatus in a (e.g. predefined) desired relationship, the method comprising: identifying a point of interest on the object to be inspected by a user manually arranging the non-contact probe and object at a first relative configuration at which a marker feature, projected by the non-contact probe along a projector axis that is not coaxial with the optical inspection system's optical axis, identifies the point of interest; and the positioning apparatus restricting subsequent manual relative movement of the non-contact probe and object so as to guide the non-contact probe and object toward the desired relationship.

According to a further aspect of the invention there is provided an apparatus for inspecting an object, comprising: a positioning apparatus; a non-contact probe mounted on the positioning apparatus comprising an optical inspection system having an optical axis and a projector configured to project a marker feature along a projector axis that is not coaxial with the optical axis; configured to control the positioning apparatus so as to guide relative motion of the non-contact probe and/or an object to be inspected along a path from a first relative configuration at which the marker feature identifies a target point of interest to a second relative configuration at which the target point of interest and optical inspection system are at a (e.g. predefined) desired relationship.

According to another aspect of the present invention there is provided an inspection apparatus comprising a non-contact probe mounted on a positioning apparatus, the non-contact probe comprising an optical inspection system having an optical axis and a projector configured to project a marker feature, in which the apparatus is configured to determine how to guide the relative positioning of the non-contact probe and object from a first relative configuration at which the marker feature, which is projected along a projector axis that is different to the optical axis, indicates the point of interest on the object, to a second relative configuration at which the optical inspection system and the point of interest are at a (e.g. predefined) desired relationship with respect to each other and at which the projector axis intersects the surface of the object at the same position at which it intersected the surface of the object at the first relative configuration.

According to another aspect of the invention there is provided computer program code, comprising instructions which, when executed by a processor device, causes the processor device to execute the methods described above. For example, the computer program code can cause a processor device to determine how to relatively move a non-contact probe and object from a first relative configuration at which a marker feature, projected by the non-contact probe along a projector axis that is not coaxial with the optical inspection system's optical axis, identifies the target point of interest, to a second relative configuration at which the target point of interest and optical inspection system are at the (e.g. predefined) desired relationship. The computer program code could be configured to subsequent control a positioning apparatus, so as to relatively move the non-contact probe and object from the first relative configuration to the second relative configuration.

According to a further aspect, there is provided computer readable medium, bearing computer program code as described above.

Figure 2:
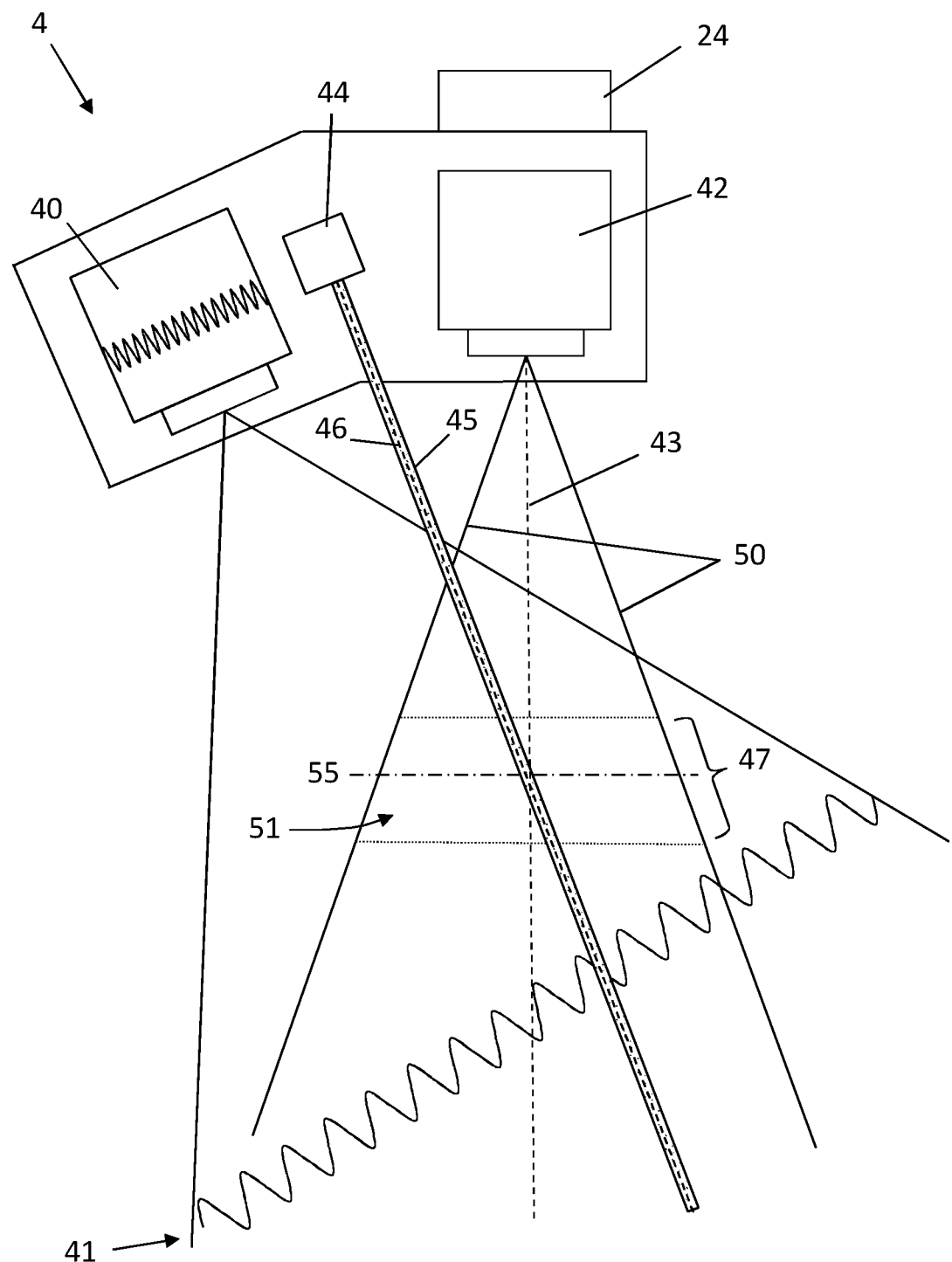
Figure 3:
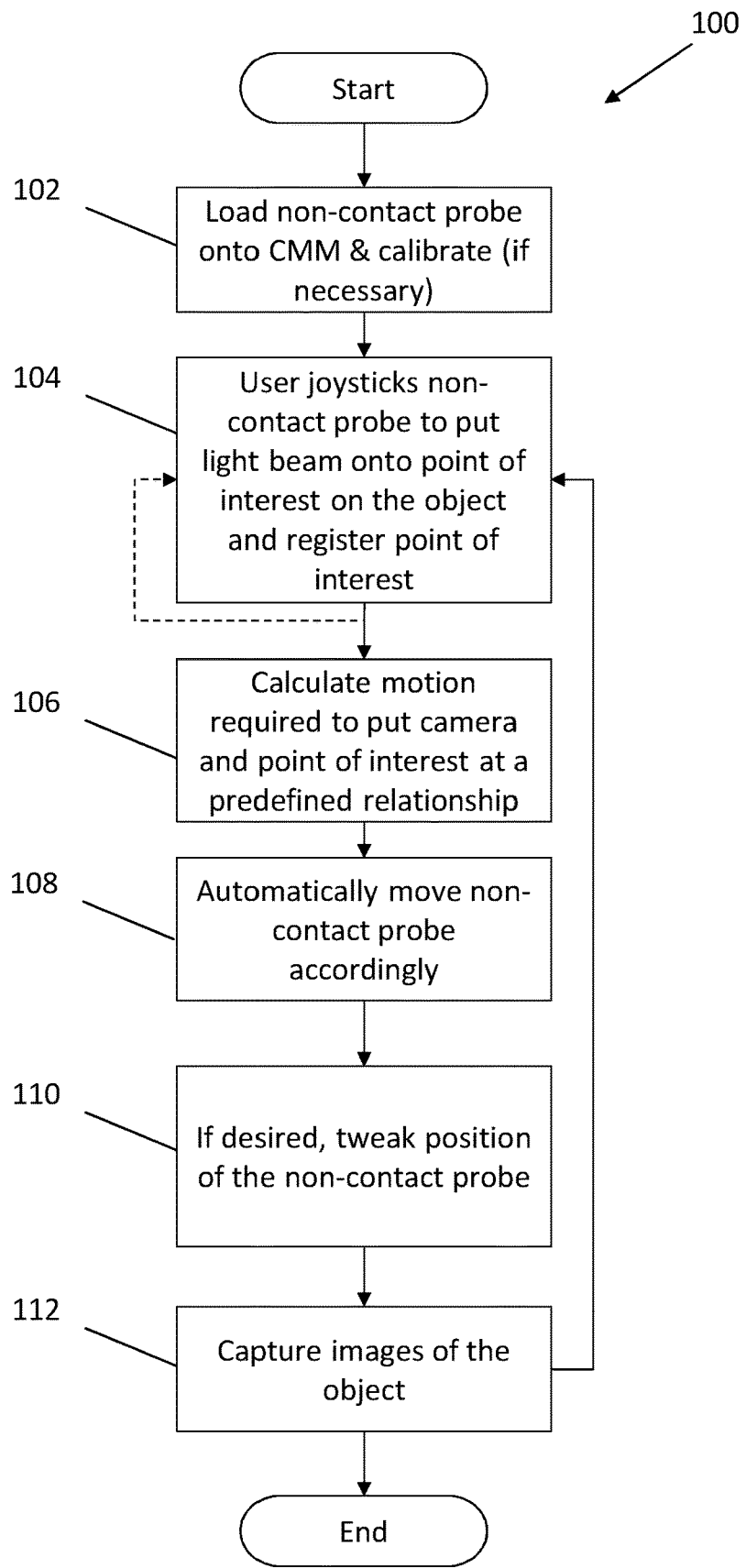
Figure 4:
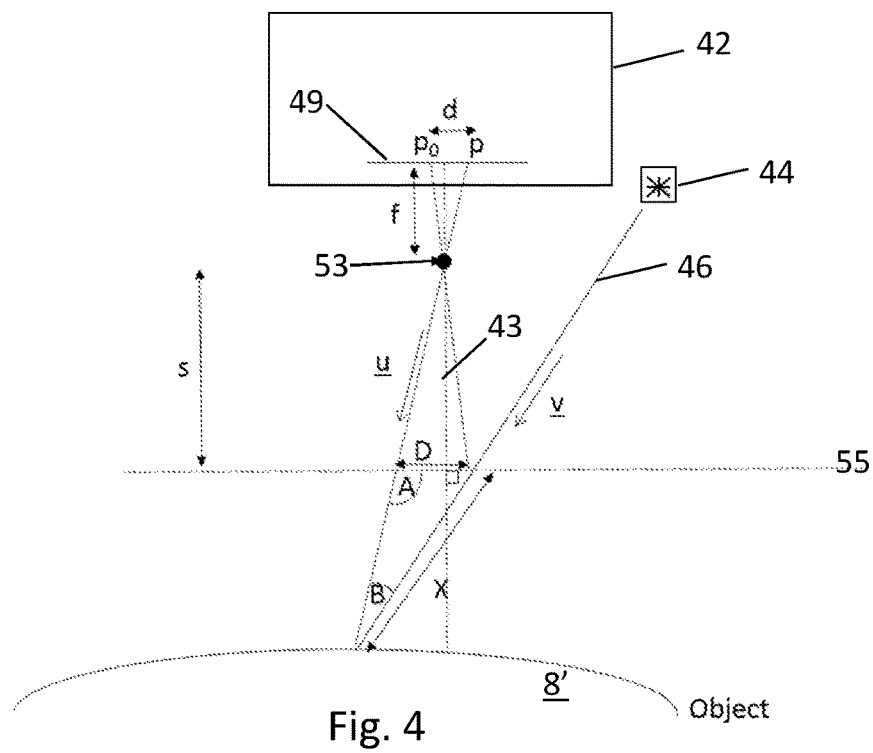
Figure 5:
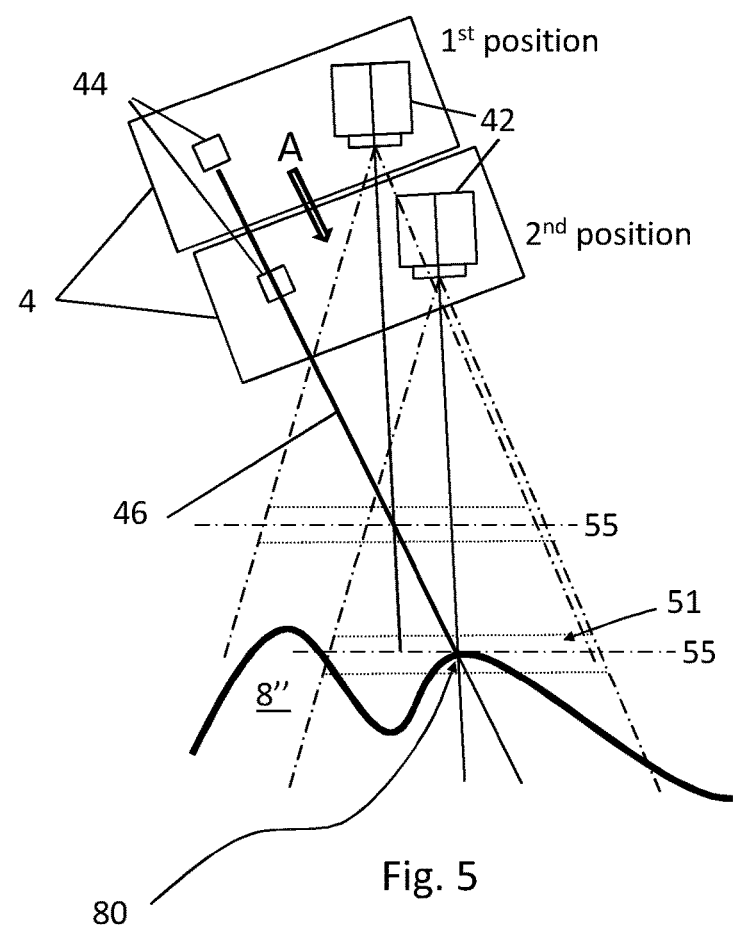
Figure 6:
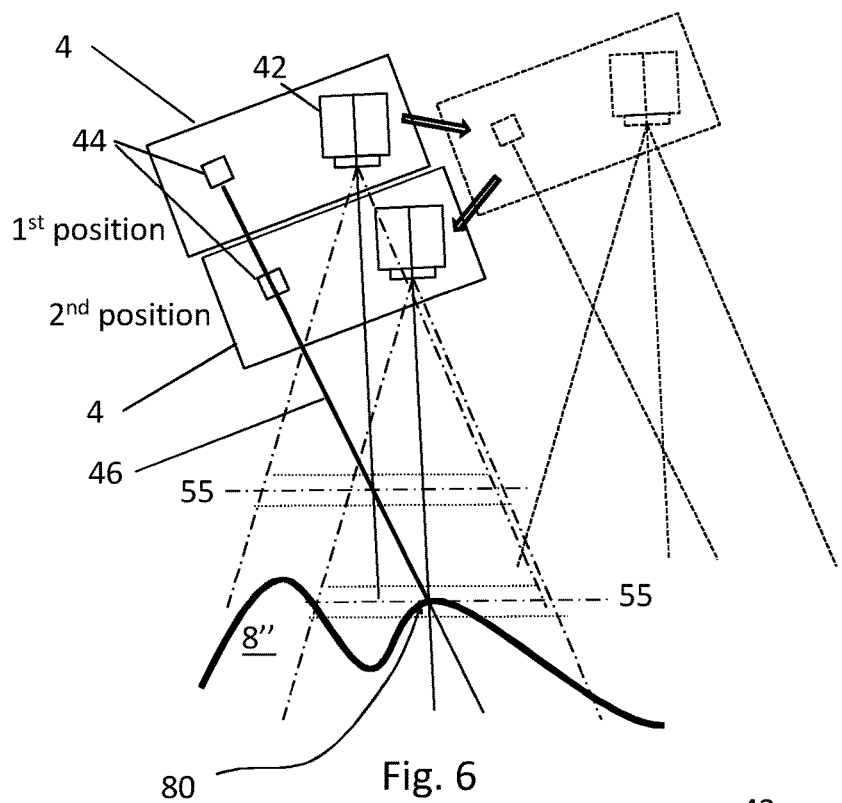
Figure 7:
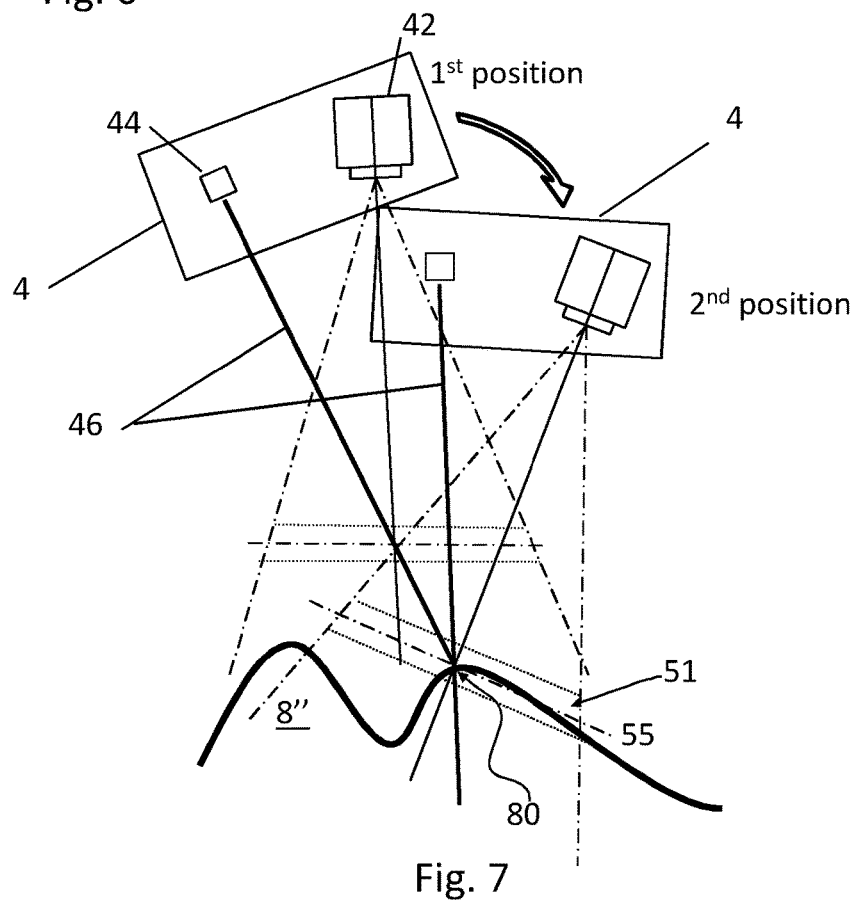
Figure 8:
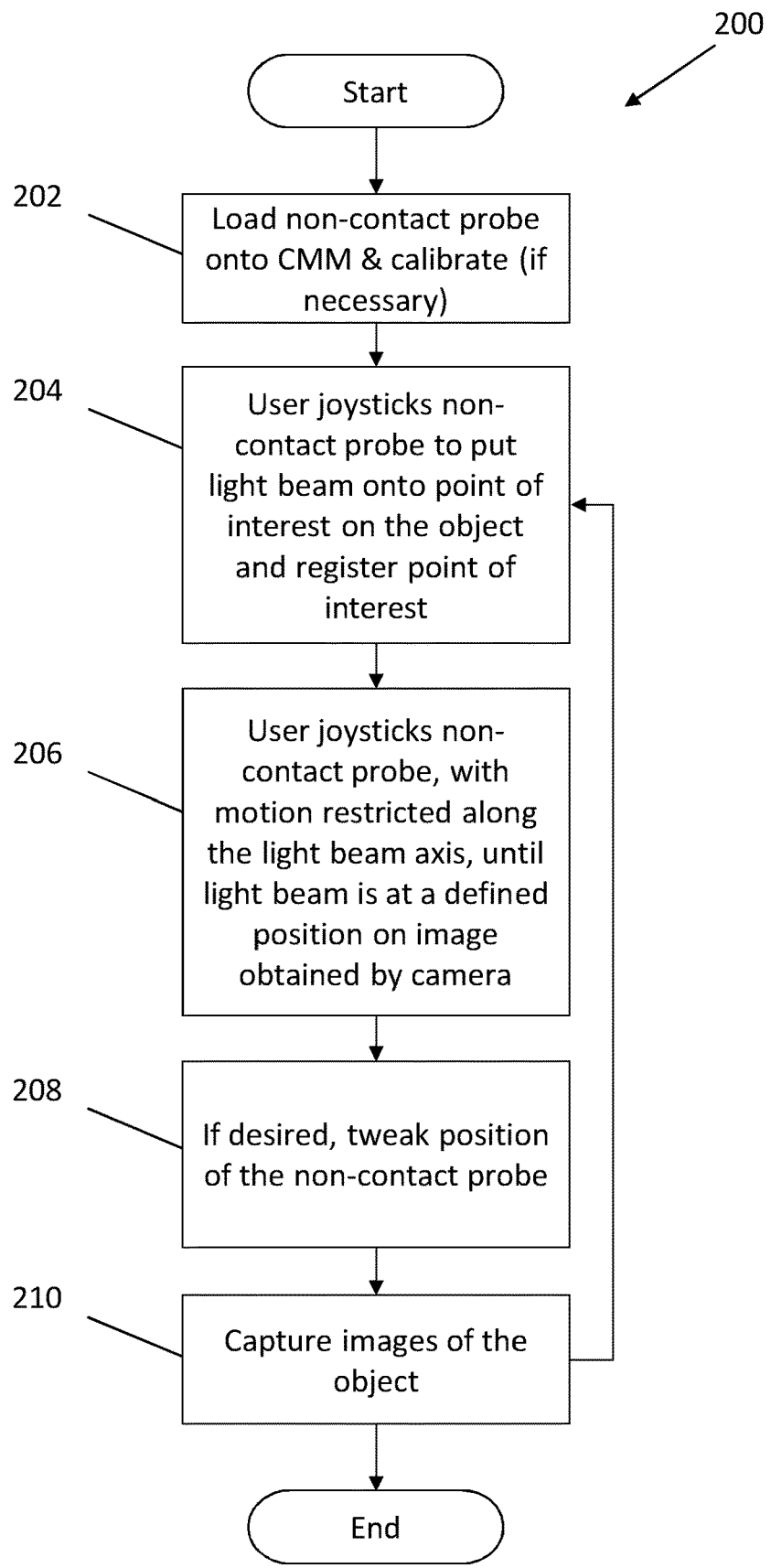

Embodiments of the invention will now be described, by way of example only, with reference to the following drawings, in which:

FIG. 1 shows a schematic isometric view of a coordinate measuring machine on which a non-contact probe is mounted;

FIG. 2 schematically illustrates a non-contact probe;

FIG. 3 illustrates an example process according a first embodiment of the invention;

FIG. 4 schematically illustrates the camera and light beam projector of the non-contact probe of FIG. 2;

FIGS. 5, 6 and 7 schematically illustrate different types of motion of the non-contact probe between a first position at which the user has placed the non-contact probe such that the light beam falls on a point of interest and a second position at which the point of interest and the camera are at a predefined relative position with respect to each other; and FIG. 8 illustrates an example process according a second embodiment of the invention.

Referring to FIG. 1 there is shown a positioning apparatus 1 comprising a movement structure in the form of a coordinate measuring machine ("CMM") 2. The CMM 2 comprises a base 10, supporting a frame 12 which in turn holds a quill 14. Motors (not shown) are provided to move the quill 14 along the three mutually orthogonal axes X, Y and Z. The quill 14 holds an articulated head 16. The articulated head 16 has a base portion 20 attached to the quill 14, an intermediate portion 22 and a probe retaining portion 24. The base portion 20 comprises a first motor (not shown) for rotating the intermediate portion 22 about a first rotational axis A. The intermediate portion 22 comprises a second motor (not shown) for rotating the probe retaining portion 24 about a second rotational axis B that is substantially perpendicular to the first rotational axis. Although not shown, bearings may also be provided between the moveable parts of the articulated head 16. Further, although not shown, measurement encoders may be provided for measuring the relative positions of the base 10, frame 12, quill 14 and articulated head 16 so that the position of the measurement probe 4 relative to a workpiece located on the base 10 can be determined.

A non-contact probe 4 is mounted on the quill 14 (in this embodiment via the articulated head 16). In the embodiment described the non-contact probe 4 is removably mounted (e.g. using a kinematic mount) on the probe retaining portion 24. In the embodiment described the non-contact probe 4 can be held by the probe retaining portion 24 by the use of corresponding magnets (not shown) provided on or in the non-contact probe 4 and probe retaining portion 24. The non-contact probe could be automatically mountable/removable, e.g. from/to a probe storage rack (not shown) located in the CMM's movement volume.

The articulated head 16 allows the non-contact probe 4 to be rotated relative to the quill 14. In particular, in the embodiment described it enables the non-contact probe 4 to be moved with two rotational degrees of freedom relative to the quill 14. The combination of the two rotational degrees of freedom provided by the articulated head 16 and the three linear (X, Y, Z) axes of translation of the CMM 2 allows the non-contact probe 4 to be moved in five degrees of freedom.

The positioning apparatus 1 also comprises a controller 26. The controller 26 comprises a CMM controller 27 for controlling the operation of the CMM 2 (either manually, e.g. via an input device such as joystick 6, or automatically, e.g. under the control of an inspection program), a probe controller 29 for controlling the operation of the non-contact probe 4 (either manually, e.g. via an input device such as joystick 6, or automatically, e.g. under the control of an inspection program) and an image analyser 31 for analysing the images obtained from the non-contact probe 4. A display device 18 can be provided for aiding user interaction with the controller 26. Also, optionally, the display device 18 can show live and/or previously captured information obtained by the non-contact probe 4. For example, when the non-contact probe 4 comprises a camera (which as explained in more detail below is the case in the described embodiment), the display device 18 could show live and/or previously captured images.

The controller 26 may be a dedicated electronic control system and/or may comprise a personal computer. Also, the CMM controller 27, probe controller 29 and image analyser 31 need not be part of the same physical unit as shown in FIG. 1; for instance, they could be provided by separate physical devices. Additional and/or alternative modules could also be provided.

It should be noted that FIG. 1 provides only a top level description of a CMM 2. A more complete description of such apparatus can be found elsewhere; for example, see EP0402440 the entire content of which is incorporated herein by this reference.

In the embodiment described the non-contact probe 4 comprises a fringe projection probe. In particular, in the described embodiment the non-contact probe 4 is configured to project a structured light pattern in the form of an optical pattern the intensity of which varies sinusoidally in one dimension (a "fringe pattern"). The non-contact probe 4 captures one or more images of the fringe pattern on the object 8 and they are subsequently analysed (e.g. by the non-contact probe 4 or by a device external to the non-contact probe 4 such as the image analyser 31) to determine the topography of the object 8. Such a process is well known and for instance described in WO2009/024757 and WO2011/030090. However, as will be understood the invention is applicable to other types of non-contact probe. For example, the non-contact probe could be configured to project other forms of structured light, such as for example a single line stripe, a set of parallel lines having different colours or tones (e.g. alternating black and white lines, or parallel red, blue and green lines), a set of concentric circles, or even patterns of dots, squares or other regular or irregular shapes. As will also be understood the non-contact probe need not project structured light at all for the measurement of the object 8. For example, it could analyse images of the object 8 which is illuminated with uniform lighting, for example from an external/ambient light source. Furthermore, if structured light is required it could be provided by a projector that is separate to the non-contact probe 4.

Referring now to FIG. 2 the non-contact probe 4 comprises a fringe projector 40 for projecting a fringe pattern (schematically illustrated in FIG. 2 by sinusoidal wave 41) onto the object 8, an optical inspection system (which in this embodiment is an optical measurement system 42) for obtaining images of the object 8 onto which the fringe pattern is projected and a light beam projector 44. In the embodiment described the optical measurement system 42 comprises an image sensor, for example a two-dimensional charge-coupled device ("CCD"). The non-contact probe (for example the optical measurement system 42) can also comprise one or more optical elements (not shown), such as a lens to focus light (e.g. to form an image on the image sensor), mirror, and/or beam steerer or the like. The optical measurement system 42 could also be referred to as a camera and will hereinafter be referred to as inspection camera 42. The inspection camera 42 has a field of view (the boundaries of which are schematically illustrated by lines 50), an optical axis (schematically illustrated by dashed line 43), a given depth of field (schematically illustrated by the area 47 which is bounded by the dotted lines) within which a focal plane 55 is located. For effective inspection the feature/surface of interest of the object 8 and non-contact probe 4 should be arranged at a (e.g. predefined) desired relationship, which in the present embodiment is when the feature/surface of interest of the object 8 is located within the volume 51 defined by the inspection camera's field of view 50 and depth of field 47 (e.g. is at the camera's focal plane 55).

In the present embodiment the light beam projector 44 comprises a light-emitting diode ("LED") and is configured to emit a light beam 45, having a circular cross-section, along a projector axis 46. In the embodiment described the light beam 45 comprises light in the visible spectrum so that the user can see the light beam's footprint on the object 8 without any aid. As will be understood, this need not necessarily be the case and for instance the light beam 45 could comprise light outside the visible spectrum, e.g. in the infra-red or ultraviolet range. In this case, the user could see the light beam's footprint on the object via an aid, such as via a camera system sensitive to the wavelength of the light beam. Likewise, the fringe pattern 41 could comprise light in the visible or non-visible spectrum, e.g. anywhere in the infra-red to ultraviolet spectrum.

The inspection camera 42 can comprise a filter (not shown) to only allow light of a particular wavelength band (in this embodiment approximately a band of approximately 50 nm, e.g. from 425 nm to 475 nm) to fall on the inspection camera's sensor. This could be, for example, so as to filter out ambient lighting. In such a case, optionally both the fringe pattern 41 and the light beam 45 comprise light which fall within the wavelength band of the filter such that the fringe pattern and light beam 45 reflected by the object 8 can be seen by the inspection camera's 42 sensor.

As shown in FIG. 2 the inspection camera's optical axis 43 and the projector axis 46 are different; they are not coincident and in this case are also not parallel. The projector axis 46 also crosses through the inspection camera's field of view 50.

Referring to FIG. 3 an example process 100 for arranging the object 8 and non-contact probe 4 into a desired relationship will be described. Optionally the method begins with preparatory steps 102 such as loading the non-contact probe 4 onto the CMM 2. The non-contact probe 4 could also be calibrated at this stage if it has not previously been calibrated. An example calibration could comprise using two artefacts, e.g. a calibration spot and a plane. Both can be located in the CMM's volume using a previously calibrated (contact) probe. The following example calibration steps could be used. The camera could be calibrated by taking images of the calibration spot from a number of different positions by translating the probe (e.g. no changes to head angle are necessary). From the images, fit for camera parameters (principal point, principal distance, lens distortions) and mounting of the camera on the CMM (position of perspective centre and orientation of optical axis relative to some known axis system and origin in the CMM). The projector axis could be calibrated by taking images of the projector spot on the plane from a number of different distances from the plane. The phase to height calibration could comprise taking images of fringes projected onto the plane from a number of different distances and fitting a function for each pixel relating phase recorded by the pixel to distance from the camera to the plane.

At step 104 the user manually moves the non-contact probe 4 to a first configuration relative to the object, at which the light beam 45 projected by the non-contact probe 4 falls on the point of interest on the object 8. This could be done by the user using the joystick 6 to control the CMM 2 and articulated head 16. In this embodiment, at this stage the user is free to move the non-contact probe in all degrees of freedom (in this case in all three linear and two rotational degrees of freedom) in an unrestricted manner.

In alternative embodiments other input mechanisms could be used to arrange the light beam 45 projected by the non-contact probe 4 to fall onto the point of interest on the object 8, including for example manually dragging of the non-contact probe 4 into position.

As will be understood step 104 need not be performed manually. For instance, an automatic process could be used. For instance, the controller 26 could be configured to control the CMM 2, articulated head 16 and non-contact probe 4 so as to seek for a predetermined feature of interest (e.g. via image processing and feedback, and/or using information from a Computer Aided Design ("CAD") model of the object 8).

When the user is satisfied that the light beam 45 falls on the feature of interest the user registers the point of interest, by providing an appropriate signal to the apparatus via a suitable input device, e.g. by pressing a button on the joystick 6. The process then moves on to step 106 at which the motion required to put the non-contact probe and object at a second relative configuration (at which the camera 42 and point of interest are at predefined relationship with respect to each other) is calculated, e.g. by the controller 26. How this is done will be explained with reference to FIG. 4 which schematically illustrates the camera 42 and light beam projector 44 of the non-contact probe 4. In FIG. 4 the camera's sensor 49 is schematically illustrated. Also, in this example, the camera 42 is modelled as a pinhole camera. A different camera model (e.g. telecentric or fisheye) could be used, and a similar analysis would be done to find the correct distance to move. For the pinhole camera model it is assumed all rays of light from an object pass in a straight line through a pinhole and intersect with the sensor 49 which records the intensity.

FIG. 4 shows the projector axis 46 of the light beam projector 44 along which the light beam 45 is projected and shows the projector axis 46 intersecting with an object 8' at an unknown distance from the camera 42. The light beam 45 forms a visual marker feature (in this case a spot) for the user on the surface of the object 8'. The vector "v" is the unit vector direction of the projection of the spot (in other words this is the projector axis 46 shown in FIG. 2). The required distance to move along this vector "v" is denoted "X" in FIG. 4, which in this embodiment is the quantity which is to be calculated.

It is assumed that the pinhole position 53 of the camera 42, the optical axis 43 of the camera 42, the camera principal distance "f" (the distance between the sensor 49 and the pinhole position 53) and the projector axis 46 are all known from a calibration procedure and/or the CMM 2 scales information.

The point of intersection of the light beam 45 and the object 8' (in other words, the spot) is imaged at point p on the sensor 49.

Point $p_0$ indicates the position that the spot would have been imaged if the object 8' was at the focal plane 55, (i.e. at the distance "s" from the camera's pinhole shown in FIG. 4). This is a predefined point on the sensor 9.

Distance "d" indicates the distance at the image plane (i.e. at the sensor 49) between the recorded and the ideal imaged spot position:

$$d = p - p_0. \quad (1)$$

Distance "D" as indicated in the diagram can be calculated from similar triangles. Distance "f" is the principal distance of the camera 42, which could be known either from the nominal focal length of the lens or from a previously carried out calibration procedure, for example. Accordingly, distance D can be determined as follows:

$$D = s * d / f. \quad (2)$$

Vector "u" represents the vector direction of the ray of light between the spot on the object 8' and the pixel in the sensor 49 imaging it. This vector can be calculated from the image coordinate of the spot and the pinhole point 53 of the camera 42. Angle A is the angle between "u" and the normal to the optical axis 43 and is calculated using the dot product of "u" and the optical axis 43.

Angle "B" is the angle between the projector axis 46 (also "v") and the direction "u" of the ray between the spot on the object 8' and the sensor 49. "B" can be calculated from the dot product of "u" and "v".

Since "D", "A" and "B" are all known, "X" can be calculated from the sine rule:

$$X = \sin(A)/\sin(B) * D \quad (3)$$

The above described embodiment determines a suitable distance "X" so as to put the camera's focal plane 55 on the point of interest. However, as will be understood, the invention could be implemented other ways. For example, the method could comprise determining a second relative position which puts the point of interest anywhere within the volume 51 defined by the camera's field of view 50 and given depth of field 47.

At step 108 the non-contact probe 4 is automatically moved along the projector axis 46 by distance X under the control of the positioning apparatus 1 (e.g. by the controller 26 instructing and controlling the motion of the moveable axes of the CMM 2) so as to place the camera 42 of the non-contact probe 4 at the desired stand-off distance from the point of interest on the object 8' so as to ensure that the point of interest is within the volume 51 defined by the camera's field of view 50 and depth of field 47. When such motion is complete the position of the non-contact probe 4 could be tweaked, either manually or automatically (e.g. so as to place the non-contact probe 4 and object 8 at a third relative configuration). For example, the rotational position of non-contact probe 4 about the articulated head's axes A, B could be changed. For instance, this might be done so as to improve the image obtained by the sensor 49. Such motion could be constrained so as to maintain the desired predetermined relationship, e.g. so as to maintain focal plane 55 on the point of interest (or more loosely so as to maintain the point of interest within the volume 51 defined by the camera's field of view 50 and depth of field 47). For instance, such tweaking of the position of the non-contact probe 4 could be configured to take place in an "orbital mode" in which motion of the non-contact probe 4 is restricted such that the camera 42 pivots about the point of interest. Such a mode of operation is for example described in U.S. Pat. No. 8,601,701.

At step 112 one or more images of the object 8' are then acquired. In the present embodiment this involves the fringe projector 40 projecting the fringe pattern 41 onto the object 8 and the camera 42 obtaining one or more images of the surface of the object 8 on which the fringe pattern 41 falls. Such images can then be processed in order to determined information about the surface of the object 8 (e.g. to obtain measurement information). Optionally, the process explained in U.S. Pat. No. 8,792,707 is used to inspect the object and obtain measurement information about the surface of the object 8'. This process requires obtaining a plurality of fringe-shifted images. Such images could be obtained using the process set out in U.S. Pat. No. 8,792,707, or via other means (e.g. via the projector causing the shift in the fringe pattern and thereby negating the need to move the non-contact probe to effect the fringe shift). As will be understood the fringe pattern 41 need not be projected until step 112. However, it is possible for it to be projected during earlier steps.

In the above described embodiment the non-contact probe 4 is moved directly along the projector axis 46 by the distance "X" to move the camera 42 from a first position (at which the user registered the point of interest) to a second position at which the camera 42 of the non-contact probe 4 is at the desired stand-off distance from the point of interest on the object. Such a motion is schematically illustrated by FIG. 5 in which the non-contact probe 4 is moved from the first to the second position in a direction parallel to the projector axis 46 (illustrated by arrow A). As can be seen this results in the projector axis 46 intersecting the object 8" at the same point (i.e. the point of interest 80) at the first and second positions, and at the second position the point of interest is within the volume 51 defined by the camera's field of view 50 and depth of field 47 (and in particular is at the camera's focal plane 55).

As will be understood the non-contact probe 4 need not necessarily be moved directly along the projector axis 46 to the second position. For instance, it could be moved along any path to arrive at the second position. For example, FIG. 6 illustrates the same first and second positions but illustrates that rather than being moved parallel to the projector axis 46 the non-contact probe 4 is moved to the second position indirectly via a position which required a motion non-parallel to the projector axis 46.

Furthermore, in the embodiment described the second position is at a point along the projector axis 45. In other words, at the second position the projector axis 45 is parallel to the projector axis at the first position. However as will be understood this need not necessarily be the case. Rather what is important is that at the second position the projector axis 45 intersects the point of interest identified by the user at the first position. Accordingly, the motion calculated at step 106 could comprise determining how to move the linear axes of the CMM 2 as well as the rotation axes of the articulated head 16 so as to arrive at the second position so as to achieve this. For example, FIG. 7 schematically illustrates a situation in which the first position is the same as that in FIGS. 5 and 6, but in which the non-contact probe 4 has a different orientation at the second position, but the projector axis 45 still intersects the object 8" at the same point 80.

Nevertheless, moving along the projector axis 45 as described above can be desirable since it can be easier to calculate the motion required, and can be less likely to result in the point of interest being obscured, and can be less risky, e.g. from a collision point of view. Also the user is likely to have chosen an orientation of the non-contact probe 4 (that is a rotational position of the probe about the axes A, B) that was considered by the user to be desirable, and so moving along the projector axis 46 can ensure that such orientation is maintained.

As will be understood the light beam 45 need not be projected during steps 106 to 112. Optionally, the light beam 45 is projected. This can give the user confidence that the non-contact probe 4 is still targeting the desired point of interest.

Once the image(s) of the object 8 have been obtained the process can end or if more points of interest are to be inspected the process can loop back to step 104.

In the above described embodiment the positioning apparatus 1 determines second position upfront and then moves the non-contact probe 4 accordingly. In an alternative embodiment the positioning apparatus could be configured to servo the relative position of the non-contact probe 4 and object 8 until the camera 42 and point of interest are at a desired relationship (e.g. until the point of interest falls within the volume 51 defined by the camera's field of view 50 and depth of field 47). For example, this could be achieved by the positioning apparatus 1 being configured to move the non-contact probe 4 along the projector axis 46 until the light beam's footprint on the object as detected by the camera's sensor is at a predetermined position on the camera's sensor.

FIG. 8 illustrates an alternative embodiment of the invention in which the motion between the first and second positions is manually controlled by the user via the joystick 6 rather than being entirely automatically controlled. In this case the process 200 begins (in a similar way to the process 100 of FIG. 3) at step 202 with the optional preparatory steps such as loading the non-contact probe 4 onto the CMM 2 and calibration of the non-contact probe 4. Also, similar to the process 100 of FIG. 3, at step 204 the user manually moves the non-contact probe 4 so as to arrange the light beam 45 projected by the non-contact probe 4 to fall onto the point of interest on the object 8. This could be done by the user using the joystick 6 to control the CMM 2 and articulated head 16. In this embodiment, at this stage the user is free to move the non-contact probe in all degrees of freedom (in this case in all three linear and two rotational degrees of freedom).

When the user is satisfied that the light beam 45 falls on the feature of interest then the user registers the point of interest, e.g. by pressing a button on the joystick 6. In this embodiment such registration of the point of interest causes subsequent motion of the non-contact probe 4 to be restricted to motion along the projector axis 46. Accordingly, at step 206 the user can use the joystick 6 to control the motion of the non-contact probe 4 along the axis of the light beam 45 until the non-contact probe 4 and the point of interest of the object 8 are at a desired relationship. In the embodiment described this is when the point of interest of the object 8 is contained within the volume 51 defined by the camera's field of view 50 and depth of field 47. In the embodiment described this can be achieved by requiring the light beam 45 as imaged by the camera 42 to be positioned at a particular location within camera's field of view (e.g. in the middle of the camera's field of view). For example, this can be achieved by requiring the light beam's footprint as imaged by the camera 42 to be positioned at a predefined position on the camera's sensor. The user can know when this is the case by viewing images (e.g. on display 18) obtained by the camera 42 and stopping the motion when the user can see that the light beam's footprint is in at a predefined position on an image obtained by the camera 42 (e.g. in the middle of the image). Optionally a process (e.g. on the controller 26) could analyse the images obtained by the camera and provide a signal and/or stop motion when the light beam's footprint is at the predefined position in the image. Because the motion of the non-contact probe 4 is restricted so that it can only move along the axis of the light beam 45, the position of the light beam 45 on the surface of the object 8 will stay in the same position.

Such restriction of motion can help the user in putting the non-contact probe 4 at the correct height without having to be concerned about the camera 42 not targeting the point of interest. As will be understood, if the non-contact probe was not moved along the axis of the light beam 45, and for example was moved along the optical axis 43 of the camera 42, then the position of the light beam 45 falling on the object 8 will change. Furthermore, since the shape of the surface of the object is unknown (indeed, that is why it is being inspected), the position of the light beam 45 falling on the object 8 will change unpredictably. Accordingly, the wrong point on the surface of the object 8 will be located within the volume 51 defined by the camera's field of view 50 and depth of field 47 unless subsequent checking and repositioning of the non-contact probe in other dimensions is performed in order to bring the light beam 45 (which is the marker for identifying what will be inspected) back onto desired point of interest on the object 8.

Step 208 and 210 correspond to step 110 and 112 of the process 100 of FIG. 3.

All of the embodiments described above comprise the steps of the user initially identifying a target point to be inspected by arranging the non-contact probe 4 and object 8 at a first relative configuration at which a marker feature, projected by the non-contact probe 4 along a projector axis 46 that is not coaxial with the optical inspection system's optical axis 43, identifies the target point of interest, and then subsequently moving the non-contact probe 4 and/or object 8 so as to put them at a second relative configuration at which the target point of interest and optical inspection system are at the desired relationship, in which the positioning apparatus guides such motion in accordance with a predetermined path. In the embodiment of FIG. 5, the predetermined path is essentially set as being the projector axis 46 as it is at the first relative configuration of the non-contact probe 4 and object 8. In the embodiments of FIGS. 6 and 7, the predetermined path is not the projector axis as it is at the first relative configuration of the non-contact probe 4 and object 8. Rather, the predetermined path is determined in another way. For example, the predetermined path could be determined by determining the $2^{nd}$ position at which the non-contact probe is to be placed, and then determining an appropriate way in which to move the non-contact probe 4. This can comprise determining how the orientation of the non-contact probe 4 about the articulated probe head's rotational axes A, B should be controlled. In the embodiments of FIGS. 5 and 6, the orientation of the non-contact probe 4 is kept unchanged, whereas in FIG. 7 the orientation of the non-contact probe 4 is altered. Such a process of determining a path could comprise determining a collision-free path, such as that described in WO2009-024783.

In the embodiments described above, the camera 42 is used for detecting the light beam 45 on the object 8 so as to determine how to move the non-contact probe 4 as well as for detecting the projected fringe pattern 41 during subsequent inspection. However, as will be understood, this need not necessarily be the case. For instance, the non-contact probe 4 could comprise a separate camera (not shown) which is configured to detect the light beam 45 on the object 8 and from which a determination of how to move the non-contact probe 4 so as to arrange the feature/surface of interest of the object 8 within the volume 51 defined by the field of view 50 and depth of field 47 of the inspection camera 42.

In the embodiments described above, the method is described with regard to just one point of interest. However, as will be understood, multiple points of interest could be inspected using the method of the invention. This could be done one point at a time whereby the user moves the non-contact probe to register one point of interest using the light beam 45 and then the positioning apparatus guides the motion of the non-contact probe 4 (e.g. automatically) in order to put the non-contact probe 4 at the correct offset/height with respect to the point of interest at which point the surface is inspected (e.g. images of the surface are taken), before the user moves the non-contact probe 4 to a different position so as to register a different point of interest and repeat the process again. Optionally a "registration phase" could take place whereby the user registers multiple different points of interest on the surface of the object before the non-contact probe 4 is moved to the predetermined desired relationship for any of the points of interest. This could require moving (e.g. manually) the non-contact probe 4 to multiple different positions so as to position the light beam 45 so that it falls on each point of interest and then registering each of point of interest (e.g. by the user pressing a button to indicate to the positioning system that the light beam 45 is falling on a point of interest). When the registration phase is complete then the method could proceed to a "measurement phase" where the non-contact probe is automatically moved, in turn, so as to position the non-contact probe at a predetermined desired relationship (e.g. at a predetermined offset) with respect to some or all of the points of interest identified in the registration phase, and then the surface is inspected (e.g. one or more images taken) when the non-contact probe 4 is at the predetermined desired relationship. Such a process could be implemented by including a loop at step 104 in FIG. 4 as indicated by the dashed arrow, for example.

As will be understood, references to light and light source in this document is intended to mean light, and light sources configured to emit light, anywhere in the infra-red to the ultraviolet range of the electromagnetic spectrum.

In the described embodiment, the coordinate positioning machine is a serial CMM (i.e. in which the three linear degrees of freedom is provided by three independent, orthogonal axes of motion, arranged in series, in this case with an additional two rotational degrees of freedom thereby making the machine a so-called 5-axis machine). However, as will be understood, the invention can also be used with other types of measuring machines, e.g. different types of positioning machines, such as parallel CMMs, (robot) measuring arms or the like. The invention can also be used with machines other than dedicated measuring machines, for example it can be used with positioning machines such as machine tools. Furthermore, as will be understood, the invention is also suitable for use with Cartesian and non-Cartesian positioning machines, such as polar and spherical coordinate positioning machines.

The invention claimed is:

1. A method of putting a point of interest on an object and an optical inspection system of a non-contact probe mounted on a coordinate positioning apparatus in a desired relationship, the method comprising:
   a) manually manipulating the relative position and/or relative orientation of the non-contact probe and the object so as to arrange the non-contact probe and object at a first relative configuration at which a marker feature, which is projected by the non-contact probe along a projector axis that is not coaxial with the optical inspection system's optical axis, falls on the point of interest;
   b) receiving an indication that the marker feature identifies the point of interest; and
   c) subsequently moving the non-contact probe and/or object so as to put them at a second relative configuration at which the point of interest and optical inspection system are at the desired relationship, in which the coordinate positioning apparatus is configured to guide such motion so that at the second relative configuration the projector axis intersects the surface of the object at substantially the same position at which it intersected the surface of the object at the first relative configuration.

2. A method as claimed in claim 1, in which during motion between the first and second configurations, the projector axis intersects the surface of the object at substantially the same point at which it intersected the surface of the object at step a).

3. A method as claimed in claim 1, in which the change in position between the first and second configurations is along an axis parallel to the projector's projector axis at the first relative configuration.

4. A method as claimed in claim 1, in which the non-contact probe and object move relative to each other between the first and second configurations along a line parallel with the projector's projector axis at the first relative configuration.

5. A method as claimed in claim 1, in which step a) comprises a person manually manipulating the relative configuration of the object and/or non-contact probe, optionally probe via a joystick.

6. A method as claimed in claim 1, in which the marker feature on the object is visible to a person.

7. A method as claimed in claim 1, in which step c) comprises the positioning apparatus automatically moving the non-contact probe and/or object so as to put the optical inspection system and at the point of interest at the second relative configuration.

8. A method as claimed in claim 1, comprising automatically determining the extent of motion required so as to put the optical inspection system and the point of interest at the second relative configuration.

9. A method as claimed in claim 8, in which automatically determining the extent of motion comprises determining where the marker feature falls on a sensor of the non-contact probe at the first relative configuration.

10. A method as claimed in claim 1, in which the desired relationship comprises a predefined distance between the optical inspection system and the point of interest and/or a predefined location of the point of interest on a sensor of the optical inspection system.

11. A method as claimed in claim 1, in which the optical inspection system comprises a camera.

12. A method as claimed in claim 1, in which non-contact probe is configured to project an optical pattern onto the object, which is detectable by the optical inspection system, and optionally in which optical inspection system is configured to detect the optical pattern and the marker feature.

13. A method as claimed in claim 12, in which the optical pattern and marker feature are distinct from each other such that they can be projected together, or individually.

14. A method as claimed in claim 1, comprising determining a control path for guiding relative movement of the non-contact probe and the object from their relative position at step a) toward the desired relationship, and in which in step c) the positioning apparatus is configured to guide such motion in accordance with the control path.

15. A method as claimed in claim 1, comprising obtaining surface position measurement information about the object.

16. A method of putting a point of interest on an object and an optical inspection system of a non-contact probe mounted on a positioning apparatus in a desired relationship, the method comprising:
   a user manually arranging the non-contact probe and object at a first relative configuration at which a marker feature, projected by the non-contact probe along a projector axis that is not coaxial with the optical inspection system's optical axis, falls on and thereby identifies a point of interest on the object;
   then, receiving an input from the user that the marker feature identifies the point of interest on the object;
   then, the positioning apparatus automatically moving the non-contact probe and/or object so as to put them at a second relative configuration at which the point of interest and optical inspection system are at the desired relationship; and
   then, inspecting the point of interest on the object with the non-contact probe.

17. A method of putting a point of interest on an object and an optical inspection system of a non-contact probe mounted on a positioning apparatus in a desired relationship, the method comprising:
   a user manually arranging the non-contact probe and object at a first relative configuration at which a marker feature, projected by the non-contact probe along a projector axis that is not coaxial with the optical inspection system's optical axis, falls on and thereby identifies a point of interest on the object;
   then, receiving an input from the user that the marker feature identifies the point of interest on the object;
   then, operating the positioning apparatus such that subsequent manual relative movement of the non-contact probe and object is restricted so as to guide the non-contact probe and the identified point of interest on the object toward the desired relationship; and
   then, inspecting the point of interest on the object with the non-contact probe.

18. A method as claimed in claim 17, in which the subsequent manual relative movement is restricted to motion along the projector axis.

19. A computer readable medium storing a computer-executable program that causes a computer to perform a process in an inspection apparatus, the apparatus including a non-contact probe mounted on a coordinate positioning apparatus, the non-contact probe comprising an optical inspection system having an optical axis and a projector configured to project a marker feature along a projector axis that is different to the optical axis, the process comprising:

based on a received indication from a user that the marker feature falls on and thereby identifies a point of interest on a surface of an object at a first relative configuration of the non-contact probe and the object, determining how to guide the non-contact probe and/or object to a second relative configuration at which the optical inspection system and the indicated point of interest are at a desired relationship, and at which the projector axis intersects the surface of the object at the same position at which it intersected the surface of the object at the first relative configuration.

20. An apparatus for inspecting an object, comprising:
a positioning apparatus;
a non-contact probe mounted on the positioning apparatus comprising an optical inspection system having an optical axis and a projector configured to project a marker feature along a projector axis that is not coaxial with the optical axis;
in which, the positioning apparatus is configured to receive an indication from a user that the marker feature falls on and identifies a point of interest on a surface of an object to be inspected and, based on an indicated point of interest, the apparatus is configured to control the positioning apparatus so as to guide relative motion of the non-contact probe and/or the object to a relative configuration at which the indicated point of interest and optical inspection system are at a desired relationship.

21. An apparatus as claimed in claim 20, in which the apparatus is configured to control the positioning apparatus so as to guide relative motion of the non-contact probe and/or an object along a path from a first relative configuration at which the marker feature identifies the identified point of interest to a second relative configuration at which the identified point of interest and optical inspection system are at the desired relationship.

22. An inspection apparatus comprising a non-contact probe mounted on a coordinate positioning apparatus, the non-contact probe comprising an optical inspection system having an optical axis and a projector configured to project a marker feature along a projector axis that is different to the optical axis, in which the inspection apparatus is configured to receive an indication that the marker feature falls on and thereby identifies a point of interest on a surface of an object at a first relative configuration of the non-contact probe and the object, and is configured to determine, based on the indicated point of interest on the surface of the object identified by the marker feature, how to guide the non-contact probe and/or object to a second relative configuration at which the optical inspection system and the indicated point of interest are at a desired relationship, and at which the projector axis intersects the surface of the object at the same position at which it intersected the surface of the object at the first relative configuration.

23. The method of claim 16, wherein the step of inspecting the point of interest with the non-contact probe includes capturing an image of the point of interest with a camera.

24. The method of claim 17, wherein the step of inspecting the point of interest with the non-contact probe includes capturing an image of the point of interest with a camera.

* * * * *